Patented May 21, 1929.

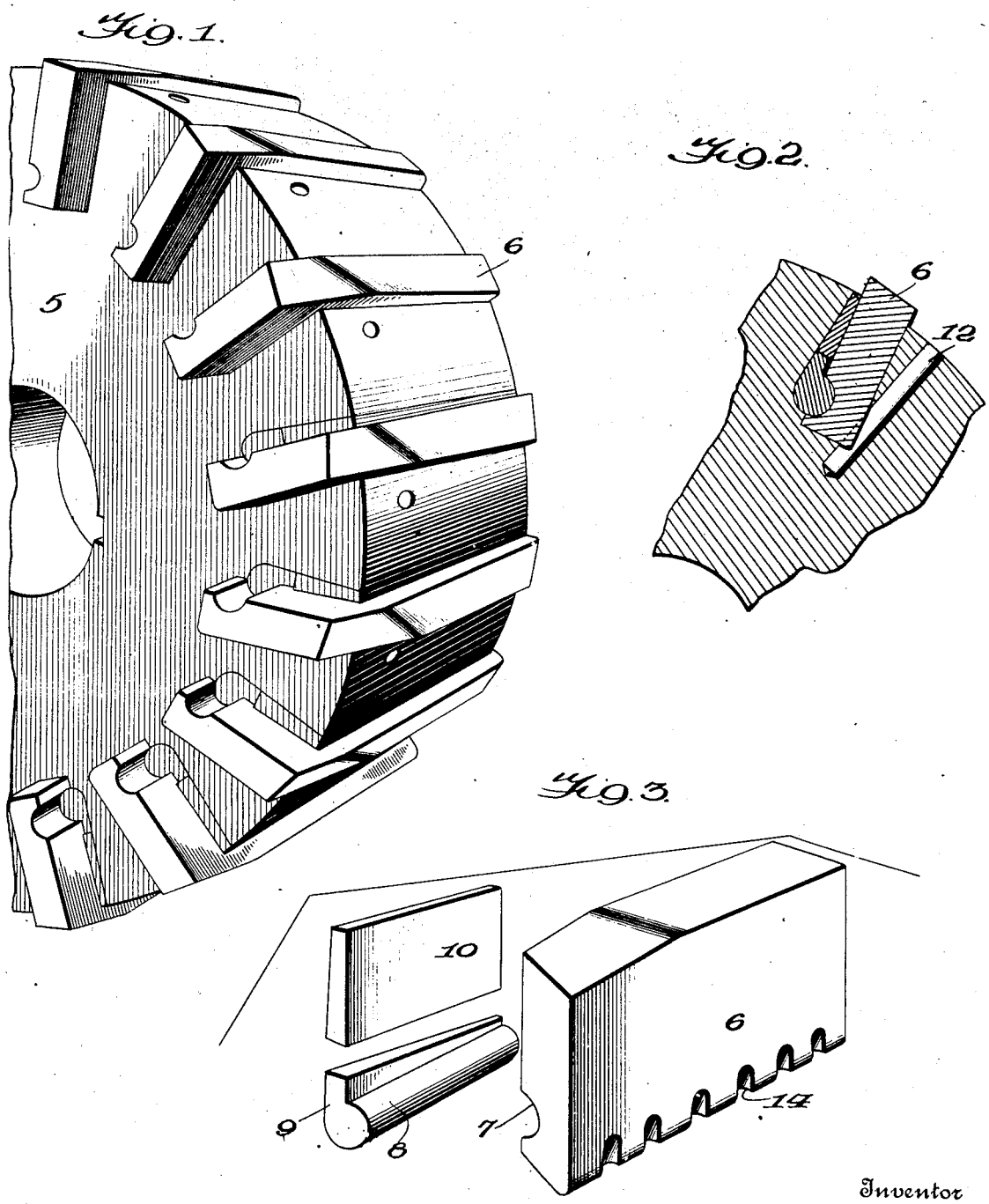

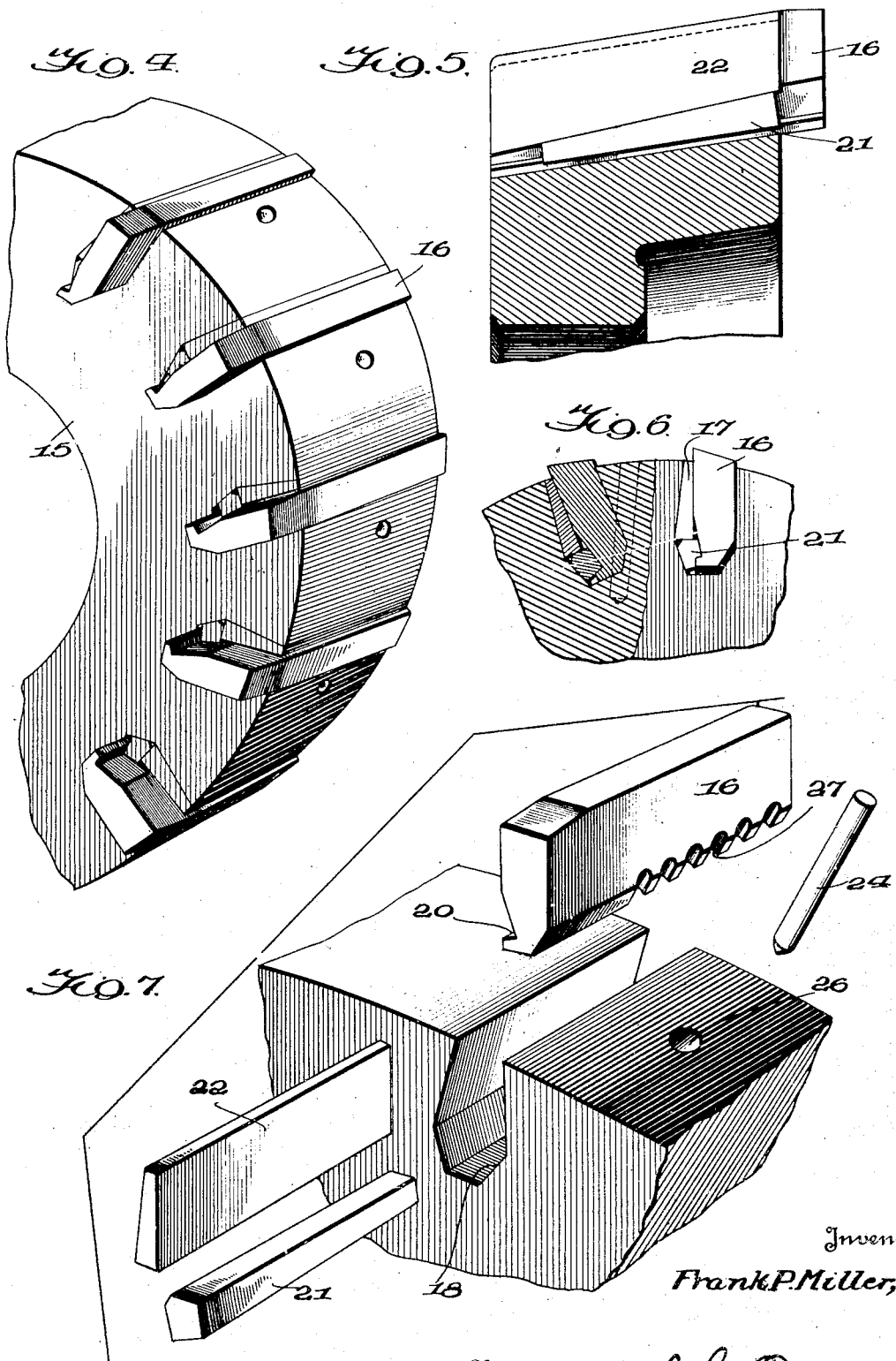

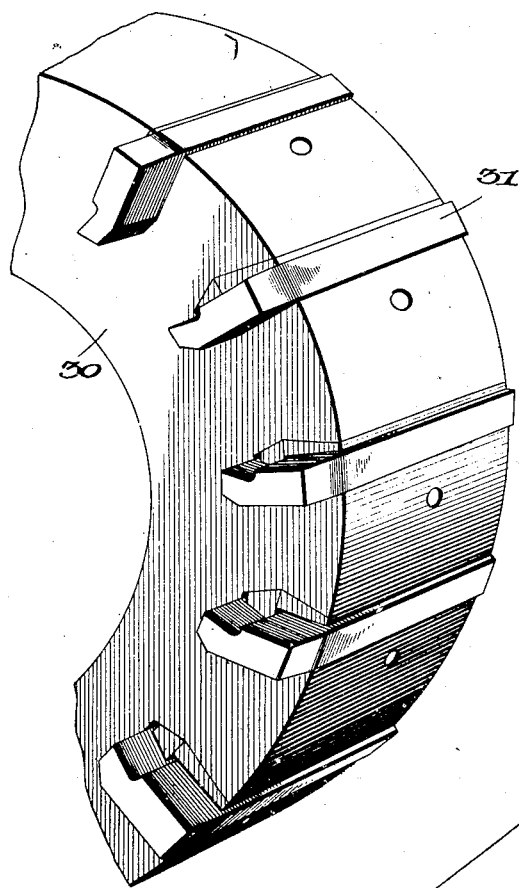
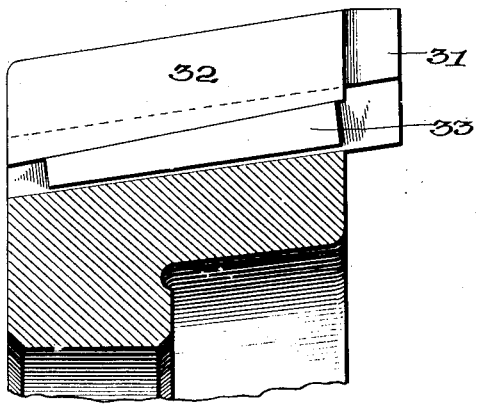
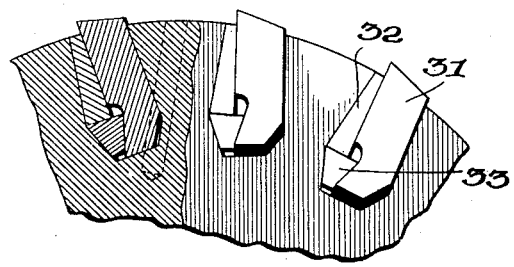
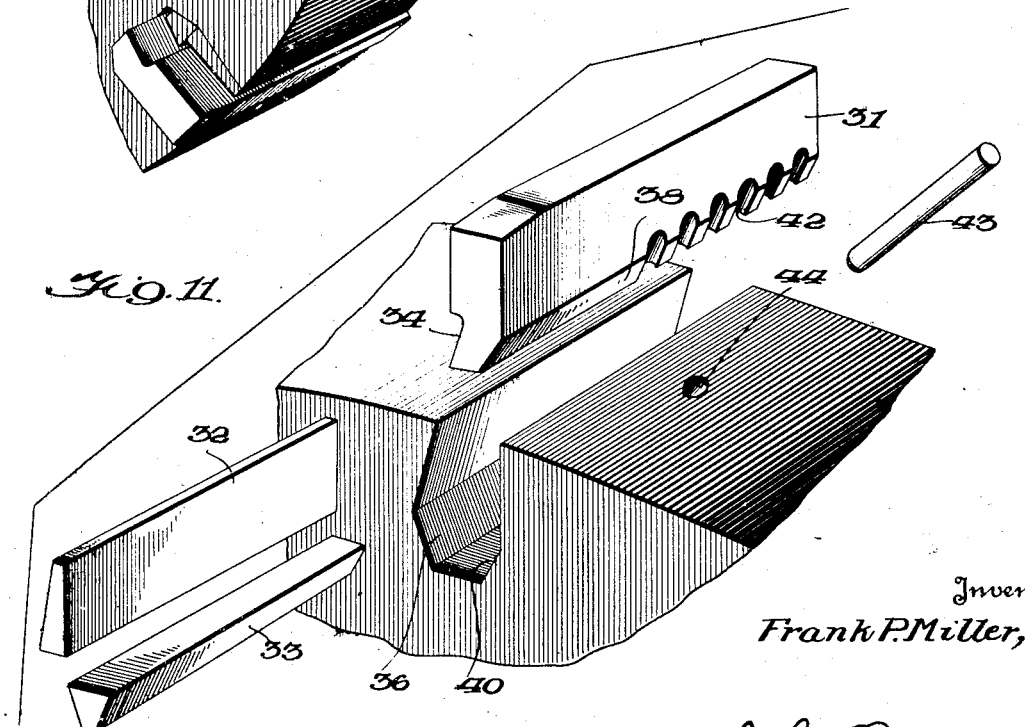

1,714,098

UNITED STATES PATENT OFFICE.

FRANK P. MILLER, OF MEADVILLE, PENNSYLVANIA.

ROTARY CUTTER.

Application filed May 11, 1926. Serial No. 108,295.

This invention relates to rotary cutters of the inserted blade type and more particularly to the adjusting and the securing means for the blades.

Briefly stated, an important object of the invention is to provide simple means whereby the blades upon being adjusted may be firmly locked against endwise and edgewise shifting as the result of the use of the cutter.

Other objects and advantages will be apparent during the course of the following description.

In the accompanying drawings forming a part of this application and in which like numerals are employed to designate like parts throughout the same, Figure 1 is a fragmentary perspective of a rotary cutter embodying the invention;

Figure 2 is a fragmentary transverse sectional view through the same;

Figure 3 is a perspective of one of the blades and the holding means therefor;

Figure 4 is a fragmentary perspective illustrating a modification of the invention;

Figure 5 is a fragmentary longitudinal sectional view through the cutter illustrated in Figure 4;

Figure 6 is a fragmentary end elevation of the cutter illustrated in Figure 4, parts being shown in section;

Figure 7 is a fragmentary group perspective illustrating one of the blades and the supporting and fastening means therefor;

Figure 8 is a fragmentary perspective illustrating another form of the invention;

Figure 9 is a fragmentary longitudinal sectional view through the cutter illustrated in Figure 8;

Figure 10 is a fragmentary end elevation of the rotary cutter illustrated in Figure 8;

Figure 11 is a group perspective illustrating one of the blades shown in Figure 8 and the supporting and fastening means therefor.

In the drawings, the numeral 5 designates an annular carrier having grooves for the reception of blades 6, the outer portions of which extend beyond the periphery of the carrier and have conventional or other cutting means.

One side of each blade 6 is provided with a longitudinally extending groove or channel 7 substantially semicircular in cross-section for snugly receiving the laterally projecting rib 8 of a taper key 9. Figure 3 clearly illustrates that the laterally projecting rib 8 is substantially semi-circular in cross-section and is adapted to be snugly received in the channel 7.

Referring now to Figure 2 it will be seen that the inner edge of the taper key 9 is rounded and rests on a rounded seat in one side wall of the groove in the carrier and that the said rounded seat and the channel 7 have the same radius.

In carrying out the invention, the key 9 is formed with a uniformly sloping edge which flatly contacts with the oppositely sloping or inclined lower edge of a wedge 10. The wedge which in addition to being tapered longitudinally is tapered transversely toward the outer edge thereof seats on the sloping upper edge of the key 9, as previously stated, and is forced outwardly into pressure contact with one side of the blade 6 and one side wall of the groove in which the blade is located. When the wedge 10 is forced outwardly a lateral pressure is exerted on the blade 6 so that the same is firmly and positively locked against edgewise shifting. It is important to note that the advancement of the taper key 9 causes the laterally disposed rib 8 to exert an inward and lateral pressure to effectively cooperate with the wedge in seating the blade and holding the same in place. It is thus seen that the advancement of the key 9 causes the associated blade to have firm pressure contact with the bottom of the groove and with one side wall of the same.

The end thrust on each blade is transmitted to the body through the medium of a thrust pin 12, which, as shown in Figure 2, intersects the inner portion of the groove and extends through one of a series of notches 14 in the adjacent portion of the blade. This arrangement anchors the end portions of the pin 12 and results in the engagement of the pin between the anchored portions thereof with the blade 6 so that the thrust will not result in the distortion of the pin.

The series of notches 14 provides for the longitudinal adjustment of the blade when it is desired to compensate for wear or to vary the cutting diameter of the tool.

In the form of invention shown in Figures 4 to 7, inclusive, the carrier is designated by the numeral 15 and is provided with a series of grooves having converging side walls between which blades 16 and transversely tapered wedges 22 are positioned.

In describing any one of the grooves in the body it might be said that the side walls of the same are divided into outwardly inclined contact faces and outer inwardly directed faces, the purpose of which will appear.

Each blade 16 has a beveled edge for flatly seating on the adjacent outwardly directed face 18 of one wall of the groove and the inner edge of the blade is flatly seated on the bottom of the groove as shown in Figure 6.

Each blade is also provided with a longitudinally extending groove or channel in one side wall thereof, which channel is gradually deepened toward the inner edge of the blade to define a shoulder 20, against which the inner edge of a taper key 21 engages. The outer edge or surface of the taper key is engaged with the inner edge of a transversely tapered wedge 22 so that when the taper key 21 is advanced the transversely tapered wedge 22 will be forced outwardly into pressure contact with the adjacent side of the blade 16 and the adjacent inwardly directed face of the groove. When the taper key 21 is driven forwardly the same will have pressure contact with the shoulder 20 so that the blade 16 is forced flatly into seating engagement with the bottom wall of the groove and with the face 18. This arrangement results in forcing the blade 16 laterally and inwardly into firm seating engagement with the walls of the groove with which it has contact.

Figure 6 illustrates that the longitudinally tapered key 21 has contact with the outwardly inclined face of one wall of the groove so that the key itself is also held against movement.

The end thrust on the blade 16 is transmitted to the body by a thrust pin 24 which as suggested in Figure 7 is driven into an opening 26, the inner portion of which intersects the groove in the body so that the pin is engaged intermediate the ends thereof in one of a series of notches 27 in the beveled inner edge portion of the blade 16. Of course, the pin 24 is snugly received in one of the notches 27 to transmit the end thrust on the blade 16 to the body.

In the form of invention shown in Figures 8 to 11, inclusive, the carrier is designated by the numeral 30 and is provided with an annular series of grooves for the reception of blades 31, wedges 32, and taper keys 33, the relation of which clearly appears in Figures 10 and 11.

The blade 31 is provided in one side thereof with a groove or channel 34 gradually deepening toward the outer edge of the blade to define a shoulder against which one beveled edge of the tapered key 33 engages as shown in Figure 11. The other beveled edge of the tapered key 33 seats against an outwardly directed face 36 of one wall of the groove.

The key 33 which, of course, is tapered longitudinally as clearly shown in Figure 9 is engaged with the inner edge of the longitudinally and transversely tapered wedge 32 so that when the key is advanced the wedge will be forced outwardly into pressure contact with one wall of the blade and with an inwardly directed face of one wall of the grove as clearly shown in Figure 10. Also when the tapered key 33 is advanced and exerts a substantially radial pressure on the wedge 32 it will exert a lateral and inward pressure on the blade and more particularly on the shoulder 34 of the same so that the blade is firmly seated. Figure 10 clearly illustrates that the blade 31 is adapted to flatly seat on the bottom wall of the groove and that the beveled inner edge 38 is adapted to flatly seat on the outwardly inclined face 40 of one wall of the groove, which face is opposite the face 36.

In carrying out this form of invention, the beveled portion 36 of the blade is provided with a series of notches 42 through which a thrust pin 43 is selectively extended, the thrust pin being extended through an opening 44 in the body whereby the pin will transmit the end thrust on the blade to the body. Figure 10 illustrates that the pin 43 is engaged between its ends with the blade and that the ends of the pin are firmly anchored to the body. When it is desired to change the adjustment of the blade it is not necessary to remove the pin 43, it simply being necessary to detach the wedge 32 and the tapered key 33 and move the blade longitudinally along the inclined bottom wall of the groove whereby the cutting diameter of the tool is changed.

The foregoing description and the accompanying drawings apply to various styles of rotary cutters such as the milling cutter illustrated, a boring bar, a counter borer, or a reamer, and it is obvious that the inventive idea disclosed may be carried out in connection with any of these tools and that such minor changes in arrangement and construction of parts may be made as will remain within the spirit of the invention and the scope of what is claimed.

Having thus described the invention, what is claimed is:

1. A rotary cutter comprising a carrier having a groove, a blade in said groove and having a longitudinal channel, a tapered wedge between said blade and one wall of the groove, and a taper key engaged with said wedge and having a lateral rib snugly received in the channel in said blade, said lateral rib exerting a lateral and inward pressure on said blade.

2. A rotary cutter comprising a carrier having a groove, a blade in said groove and having a channel, a wedge between said blade and one wall of the groove, and a key engaged with said wedge and having a rib snugly received in the channel in said blade and having pressure engagement with the wall thereof to secure the blade in place, said wedge being tapered longitudinally and transversely.

3. A rotary cutter comprising a carrier having a groove, a blade in said groove and having a channel extending longitudinally thereof, a wedge between said blade and one wall of said groove and having converging side walls, a taper key engaged with the inner edge of said wedge and having a laterally projecting rib received in said channel, one wall of said groove being provided with a seat for the taper key, said seat and said channel being curved transversely and having substantially the same radii.

4. A rotary cutter comprising a carrier having a groove, a blade in the groove and having a channel, a tapered key having a laterally projecting rib received in said channel, one side wall of said groove being provided with a seat for the tapered key, said seat and said channel being curved transversely, and a wedge to secure the key in place, said rib being adapted to exert a lateral and inward pressure on said blade.

5. A rotary cutter comprising a carrier having a groove, a blade in said groove and having a channel extending longitudinally thereof, a wedge between said blade and one wall of said groove and having converging side walls, a key engaged with the inner edge of said wedge and having a laterally projecting rib received in said channel, one wall of said groove being provided with a seat for the key, said seat and said channel being curved transversely and having substantially the same radii, said rib being adapted to exert a lateral and inward force on said blade, and a thrust pin carried by said carrier and engaged with said blade to transmit the end thrust on the blade to the carrier.

6. A rotary cutter comprising a body having a groove provided with converging side walls, a blade in said groove and having a longitudinally extending channel, a longitudinally and transversely tapered wedge between said blade and one side wall of said channel, a taper key having a sloping edge engaging the inner edge of said wedge to force the same outwardly into pressure engagement with said blade, said key being provided with a rounded inner edge and with a laterally projecting rib substantially semi-circular in cross-section, one side wall of said groove being provided with a transversely curved seat for said key, the laterally disposed rib of said key being snugly received in said channel and exerting inward and lateral pressure on the blade, and means transmitting the thrust on said blade to said carrier, said shoulder and said channel having substantially the same radii.

7. A rotary cutter comprising a body having a groove provided with converging and diverging faces, a blade in said groove, a wedge confined between said blade and one of said converging faces, and a taper key engaged with said wedge, said blade, and one of said diverging faces, said blade being provided with a beveled edge engaged with the other diverging face.

8. A rotary cutter comprising a body having a groove, a blade in said groove and having a channel gradually increasing in depth toward the inner edge of the blade thereby defining a shoulder, a wedge between said blade and one wall of said groove, and a taper key engaged with said wedge and with said shoulder to force the wedge outwardly and the blade inwardly and laterally.

9. A rotary cutter comprising a body having a groove, a blade in said groove and having a channel gradually increasing in depth toward the inner edge of the blade thereby defining a shoulder, a wedge between said blade and one wall of said groove, and a key engaged with said wedge and with said shoulder to force the wedge outwardly and the blade inwardly, the side walls of said groove being provided with diverging faces, one of which is engaged by said key, said blade being provided with a beveled corner engaged with the other diverging face.

10. The construction set forth in claim 9, and means transmitting the end thrust on said blade to said carrier.

11. A rotary cutter comprising a carrier having a groove provided with side walls having diverging faces, a blade received in said groove and having a beveled corner engaged with one of said diverging faces, said blade also being provided with a channel deepened toward the inner edge of the blade thereby defining a shoulder, a taper key partially received in said channel and engaging said shoulder and flatly contacting with one of said diverging faces, and a longitudinally and transversely tapered wedge engaged by said taper key and forced outwardly thereby, said taper key exerting a lateral and inward pressure on said blade.

12. The construction set forth in claim 11, said beveled portion being provided with notches, and a thrust pin carried by said carrier and selectively extended through one of said notches to transmit the end thrust on the blade to the carrier.

13. A rotary cutter comprising a carrier having a groove, a blade in said goove and having a channel gradually deepening toward the outer edge of the blade thereby defining a shoulder, a tapered key engaging said shoulder and forcing the blade laterally and inwardly to firm seated position, and a wedge engaged by said tapered key and confined between one wall of said groove and one side face of said blade.

14. A rotary cutter comprising a carrier having a groove, a blade in said groove and having a channel gradually deepening toward the one edge of the blade thereby defining a shoulder, a key engaging said shoulder and forcing the blade laterally and inwardly to firm seated position, and a wedge engaged by said key and confined between one wall of said groove and one side face of said blade, said wedge being tapered longitudinally.

15. A rotary cutter comprising a carrier having a groove, a blade in said groove and having a channel gradually deepening toward the outer edge of the blade thereby defining a shoulder, a key engaging said shoulder, a wedge engaged by said key and confined between one wall of said groove and one side face of said blade, said wedge being tapered longitudinally and transversely.

16. A rotary cutter comprising a carrier having a groove, a blade in said groove and having a channel gradually deepening toward the outer edge of the blade thereby defining a shoulder, a tapered key engaging said shoulder and forcing the blade laterally and inwardly to firm seated position, a wedge engaged by said tapered key and confined between one wall of said groove and one side face of said blade, said wedge being tapered longitudinally and transversely, one side wall of the groove being provided with oppositely directed faces, one of which is engaged by said key and the other being engaged by said wedge.

17. The construction set forth in claim 16, and means transmitting the thrust on the ing a blade to the carrier.

18. A cutter comprising a body having a groove, a blade in said groove and having a channel, a key in said groove and said channel and adapted for pressure engagement with the walls thereof, and a wedge having direct pressure contact with both said key and said blade.

19. A cutter comprising a body having a groove, a blade in the groove, a key having pressure contact with said blade, and a wedge extending lengthwise of the blade and key and positioned between said blade and one side wall of said groove and being engaged by and forced into pressure contact with said blade by said key.

20. A cutter comprising a body having a groove, a blade therein, a wedge to hold the blade in place, and a key inwardly of the wedge and having pressure contact with both the blade and the wedge to simultaneously hold the blade and the wedge in place.

21. A rotary cutter comprising a body having a groove, a blade in the groove, a wedge between the blade and one wall of the groove, and a key extending lengthwise of and engaging said blade, there being means whereby the wedge and the key exert binding forces on said blade.

22. In a cutter, a body having a groove, a blade in the groove and having a channel, a key having a rib in said channel in pressure engagement with the wall thereof, and a wedge having pressure engagement with both the blade and the key.

23. In a cutter, a body having a groove, a blade in the groove, a wedge having pressure engagement with the blade, and a binding key having direct binding contact with both the wedge and the blade.

In testimony whereof I affix my signature.

FRANK P. MILLER.